US012354328B2

(12) United States Patent
Li et al.

(10) Patent No.: US 12,354,328 B2
(45) Date of Patent: Jul. 8, 2025

(54) METHOD, APPARATUS, COMPUTER DEVICE AND STORAGE MEDIUM FOR DETECTING OBJECTS THROWN FROM HEIGHT

(71) Applicants: China Science IntelliCloud Technology Co., Ltd., Anhui (CN); Shanghai DianZe Intelligent Technology Co., Ltd., Shanghai (CN)

(72) Inventors: Yuan Li, Anhui (CN); Xiangyu Ji, Anhui (CN)

(73) Assignees: China Science IntelliCloud Technology Co., Ltd., Anhui (CN); Shanghai DianZe Intelligent Technology Co., Ltd., Shanghai (CN)

( * ) Notice: Subject to any disclaimer, the term of this patent is extended or adjusted under 35 U.S.C. 154(b) by 322 days.

(21) Appl. No.: 18/265,870

(22) PCT Filed: Nov. 3, 2021

(86) PCT No.: PCT/CN2021/128478
§ 371 (c)(1),
(2) Date: Jun. 7, 2023

(87) PCT Pub. No.: WO2022/105609
PCT Pub. Date: May 27, 2022

(65) Prior Publication Data
US 2024/0062518 A1    Feb. 22, 2024

(30) Foreign Application Priority Data

Nov. 19, 2020   (CN) .......................... 202011306953.2

(51) Int. Cl.
*G06V 10/764*   (2022.01)
*G06V 10/82*   (2022.01)
(Continued)

(52) U.S. Cl.
CPC .......... *G06V 10/765* (2022.01); *G06V 10/993* (2022.01); *G06V 20/52* (2022.01); *G08B 21/02* (2013.01); *G06V 10/82* (2022.01)

(58) Field of Classification Search
CPC .... G06V 10/765; G06V 10/82; G06V 10/993; G06V 20/52; G08B 21/02
(Continued)

(56) References Cited

FOREIGN PATENT DOCUMENTS

| CN | 102547244 A | 7/2012 |
|---|---|---|
| CN | 105163067 A | 12/2015 |

(Continued)

OTHER PUBLICATIONS

Hassan, "Multiple object tracking using feature fusion in hierarchical LSTMs," The Journal of Engineering (Year: 2020).*

*Primary Examiner* — Kenny A Cese
(74) *Attorney, Agent, or Firm* — SZDC Law PC

(57) ABSTRACT

The present application provides a method, apparatus, computer device and storage medium for detecting objects thrown from height, the method including: setting up a video surveillance area for capturing a target video image in real time; detecting all moving objects within the target video image using a background modeling algorithm; tracking the detected moving objects using Kalman filtering to obtain trajectory characteristics and related parameters of the moving objects; identifying whether the moving objects are objects thrown from height through rule-based identification of objects thrown from height; performing classification using a Long Short-Term Memory (LSTM) network classification model, including inputting parameters of the moving objects as feature data into the LSTM, to obtain a classification result and determine whether a false positive (Continued)

occurs. The method has strong anti-interference ability and can effectively filter out moving objects other than objects thrown from height.

5 Claims, 4 Drawing Sheets

(51) Int. Cl.
*G06V 10/98* (2022.01)
*G06V 20/52* (2022.01)
*G08B 21/02* (2006.01)

(58) Field of Classification Search
USPC .......................................................... 382/103
See application file for complete search history.

(56) References Cited

FOREIGN PATENT DOCUMENTS

| | | |
|---|---|---|
| CN | 109309811 A | 2/2019 |
| CN | 111079663 A | 4/2020 |
| CN | 111553256 A | 8/2020 |
| CN | 111627049 A | 9/2020 |
| CN | 111898511 A | 11/2020 |
| CN | 111931719 A | 11/2020 |
| CN | 112418069 A | 2/2021 |

\* cited by examiner

METHOD, APPARATUS, COMPUTER DEVICE AND STORAGE MEDIUM FOR DETECTING OBJECTS THROWN FROM HEIGHT

This application is the National Stage Application of PCT/CN2021/128478, filed on Nov. 3, 2021, which claims priority to Chinese Patent Application No. 202011306953.2, filed on Nov. 19, 2020, which is incorporated by reference for all purposes as if fully set forth herein.

TECHNICAL FIELD

The present application relates to the field of image recognition technology, in particular to a method, apparatus, computer device and storage medium for detecting objects thrown from height.

BACKGROUND

In recent years, throwing and falling objects from height have occurred from time to time. Throwing objects from height is an uncivilized behavior that not only pollutes the environment but also seriously endangers the public safety of residents and disturbs social peace. In the event of injuries caused by objects thrown from height, it is difficult to locate the specific location of the perpetrator from numerous residents and hold them accountable, and there is no way to remind pedestrians on the ground to dodge in time, resulting in frequent safety accidents caused by objects thrown from height. Therefore, if we can accurately and timely locate the floor from which the objects are thrown and offer timely warning and interception, we can greatly protect people's safety of life and property. This has been a concern of society and urgently needs to be solved.

There are computer vision-based methods for detecting objects thrown from height in the prior art. Specifically, the Chinese patent CN111476973A provides a method for detecting objects thrown from height using an infrared sensing system, but the infrared sensing system is expensive and not easy to implement. The Chinese patent CN205982657U provides a method for alarming objects thrown from height based on an ultrasonic reflection detection, but such system is expensive, not easy to deploy, and susceptible to interference from the surrounding environment, resulting in insufficient accuracy. In addition, in practice, there are issues such as the inability of a single camera to monitor the entire building, the complex and variable movement of natural objects being affected by wind, climate, air resistance, and the continuous interference of other natural objects, resulting in high false detection rate and missed detection rate. That is, when the monitoring screen is complex and there is a continuous back and forth movement of natural objects, the algorithms for detecting objects thrown from height in related technologies cannot achieve the desired effect.

SUMMARY

To solve the above mentioned technical problems, the present invention provides a method for detecting objects thrown from height, comprising the following steps of:
setting up a video surveillance area for capturing a target video image in real time;
detecting all moving objects within the target video image using a background modeling algorithm;
tracking the detected moving objects using Kalman filtering to obtain trajectory characteristics and related parameters of the moving objects, including trajectory curve trend, object movement acceleration, intersection over union of previous and current frames of the object, object shape and pixel size changes;
identifying whether the moving objects are objects thrown from height through rule-based identification of objects thrown from height;
performing classification using a Long Short-Term Memory (LSTM) network classification model, including inputting trajectory curve trend, object movement acceleration, intersection over union of previous and current frames of the object, object shape and pixel size changes as feature data into the LSTM, to obtain a classification result and determine whether a false positive occurs; and
pushing an alarm to the monitoring center if the classification result of the LSTM classification model does not indicate misinformation.

Preferably, identifying whether the moving objects are objects thrown from height through rule-based identification of objects thrown from height includes setting an outer contour line of the building and a special position line, so that once the trajectory of a moving object crosses the contour line from inside to outside, or crosses the special position line from top to bottom, the object is identified as an object thrown from height.

Preferably, the background modeling algorithm is a single Gaussian model method or a Gaussian mixture model method to achieve detection of the moving objects.

Embodiments of the present application further provide an apparatus for detecting objects thrown from height, comprising:
a camera module configured to capture a target video image in real time;
a detection module configured to detect all moving objects within the target video image using a background modeling algorithm;
a tracking module configured to track the detected moving objects using Kalman filtering to obtain trajectory characteristics and related parameters of the moving objects, including trajectory curve trend, object movement acceleration, intersection over union of previous and current frames of the object, object shape and pixel size changes;
an identification module configured to identify whether the objects are objects thrown from height through rule-based identification of objects thrown from height;
a filtering module configured to perform classification using a Long Short-Term Memory (LSTM) network classification model, including inputting trajectory curve trend, object movement acceleration, intersection over union of previous and current frames of the object, object shape and pixel size changes as feature data into the LSTM, to obtain a classification result and determine whether misinformation occurs; and
an alarm module configured to push an alarm to the monitoring center.

Embodiments of the present application further provide a computer device comprising a memory, a processor and a computer program stored in the memory and executable by the processor, wherein the computer program, when executed by the processor, causes the processor to perform the method as described above.

Embodiments of the present application further provide a storage medium having a computer program stored thereon, wherein the computer program, when executed by a processor, causes the processor to perform the method as described above.

With the technical solutions described above, the present invention achieves the following advantageous effects.

The method for detecting objects thrown from height according to the present application first finds out the trajectories of the moving objects; then analyzes and filters all the trajectories to find out the trajectories that match the trajectories of objects thrown from height in the scene; then issues an alarm to the location where the throwing of objects from height occurs; and finally reduces false alarms by filtering out accidental false detections and missed detections. The method according to the present application features high real-time performance and low missed detection rate, allowing remote real-time dispatch of on-site monitoring and enabling users to obtain alarm event images and alarm event locations.

DESCRIPTION OF THE DRAWINGS

In order to more clearly illustrate the embodiments of the present invention or the technical solutions in the prior art, the accompanying drawings to be used in the description of the embodiments or prior art will be briefly described below. It is obvious that the accompanying drawings in the following description are only some of the embodiments recorded in the present invention, and other accompanying drawings can be obtained according to these accompanying drawings without creative work for those of ordinary skill in the art.

DESCRIPTION OF THE EMBODIMENTS

The technical solutions in the embodiments of the present invention will be described clearly and completely in conjunction with the accompanying drawings in the embodiments of the present invention. Obviously, the described embodiments are only a portion of the embodiments of the present invention, rather than all the embodiments.

Unless otherwise defined, all technical and scientific terms used herein have the same meaning as commonly understood by those skilled in the art of the present invention. The terms used herein are for the purpose of describing specific embodiments only and are not intended to limit the invention. The term "and/or" as used herein includes any and all combinations of one or more of the related listed items.

Figure 1:
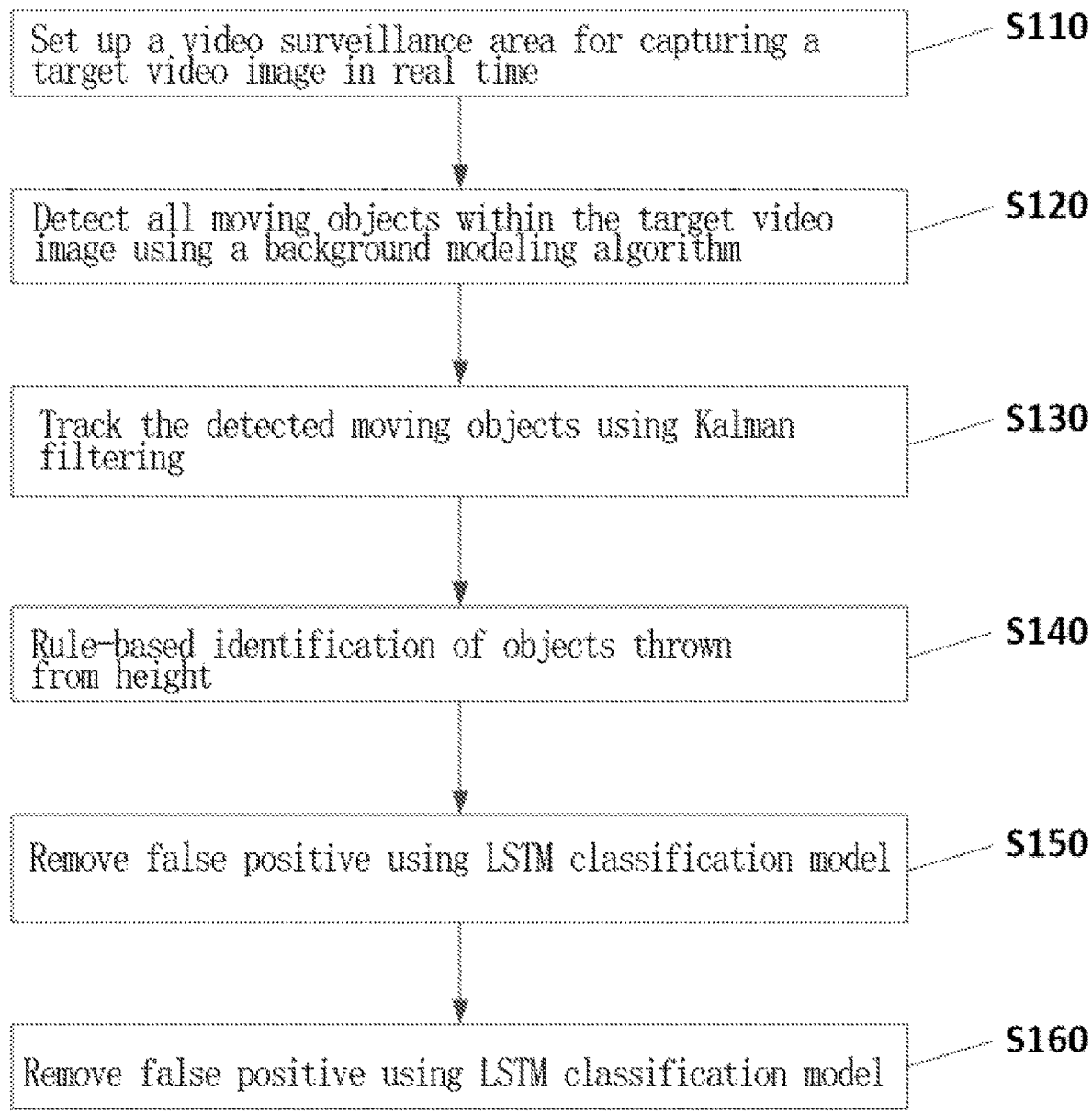
FIG. 1 is a schematic flow chart of the method for detecting objects thrown height according to an embodiment of the present application.

FIG. 1 is a schematic flow chart of the method for detecting objects thrown height according to an embodiment of the present application, the method comprising the following steps:

S110: setting up a video surveillance area for capturing a target video image in real time;

S120: detecting all moving objects within the target video image using a background modeling algorithm;

Specifically, in this embodiment, a single Gaussian model method, a Gaussian mixture model method or an optical flow method may be used to detect the moving objects.

The single Gaussian model method calculates, for a fixed pixel point in multiple video frames, the mean value and variance of N samples of the pixel value of the point in N frames of video images. The mean value and variance can be used to uniquely determine the single Gaussian background model. The value after background subtraction is compared with a threshold (three times the variance) to determine the foreground or background, whereby it can be determined whether there is a moving object.

The Gaussian mixture model sequentially extracts N frames of video images, iteratively modeling each pixel each time. The current frame is compared with what is assumed to be a static background, and an area with a significant change is considered as the area with a moving object therein.

The optical flow method detects moving objects, and dynamically analyzes the image according to the velocity vector characteristics of each pixel in the video frame. If there is no moving object in the image, the optical flow vector changes continuously throughout the image area, while when there is relative motion between the object and the image background, the velocity vector formed by the moving object is necessarily different from the velocity vector of the neighboring background, and thus the position of the moving object is detected. Since the optical flow method has to perform iterative operations, the higher the accuracy, the greater the amount of calculation.

Detecting moving objects with the single Gaussian model method, the Gaussian mixture model method or the optical flow method is prior art and will not be repeated here.

S130: tracking the detected moving objects using Kalman filtering to obtain trajectory characteristics and related parameters of the moving objects, including trajectory curve trend, object movement acceleration, intersection over union of previous and current frames of the object, object shape and pixel size changes;

The present application uses Kalman filtering algorithm to achieve accurate tracking of moving targets and obtain a multi-frame object motion trajectory.

S140: identifying whether the moving objects are objects thrown from height through rule-based identification of objects thrown from height;

Specifically, identifying whether the moving objects are objects thrown from height through rule-based identification of objects thrown from height includes setting an outer contour line of the building and a special position line, so that once the trajectory of a moving object crosses the contour line from inside to outside, or crosses the special position line from top to bottom, the object is identified as an object thrown from height.

Figure 2:
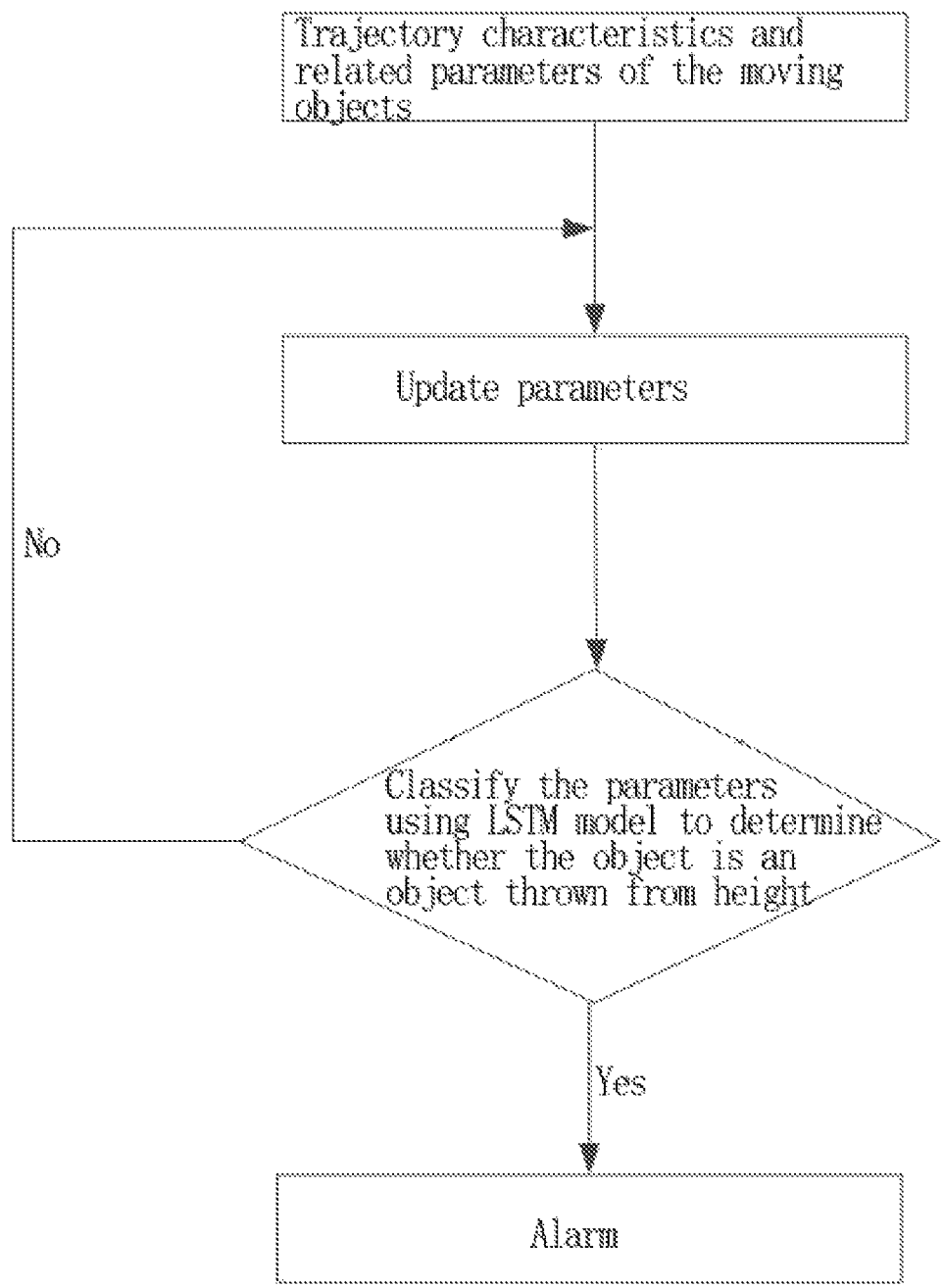
FIG. 2 is a schematic flow chart of the classification process of the Long Short-Term Memory (LSTM) network classification model according to an embodiment of the present application.

S150: performing classification using a Long Short-Term Memory (LSTM) network classification model, including inputting trajectory curve trend, object movement acceleration, intersection over union of previous and current frames of the object, object shape and pixel size changes as feature data into the LSTM, to obtain a classification result and determine whether a false positive occurs; and In the deep learning field, LSTM is a special type of RNN to solve the problem that RNN is not capable of handling long-term dependencies. FIG. 2 illustrates a schematic flow chart of the classification process of the Long Short-Term Memory (LSTM) network classification model according to an embodiment of the present application. The present embodiment uses Kalman filtering algorithm to obtain the trajectory curve trend, object movement acceleration, intersection over union of previous and current frames of the object, object shape and pixel size changes as the feature data that best represents the content of the moving objects Then input the feature data into the LSTM network for training and learning, and finally the classification result is output to determine whether the object is thrown from height.

The input layer of the LSTM network includes the extracted feature data including trajectory curve trend, object moving acceleration, intersection over union of previous and current frames of the object, object shape and pixel size changes. The number of neurons in the first LSTM hidden layer is 128, the number of neurons in the second LSTM hidden layer is 32, and the number of neurons in the final output layer is 1, which represents the probability of objects thrown from height.

Through the test, it can be seen that the model generalizes better and achieves higher accuracy of classification when five characteristic data including trajectory curve trend, object moving acceleration, intersection over union of previous and current frames of the object, object shape and pixel size changes are used as input data.

S160: pushing an alarm to the monitoring center if the classification result of the LSTM classification model does not indicate misinformation.

Figure 3:
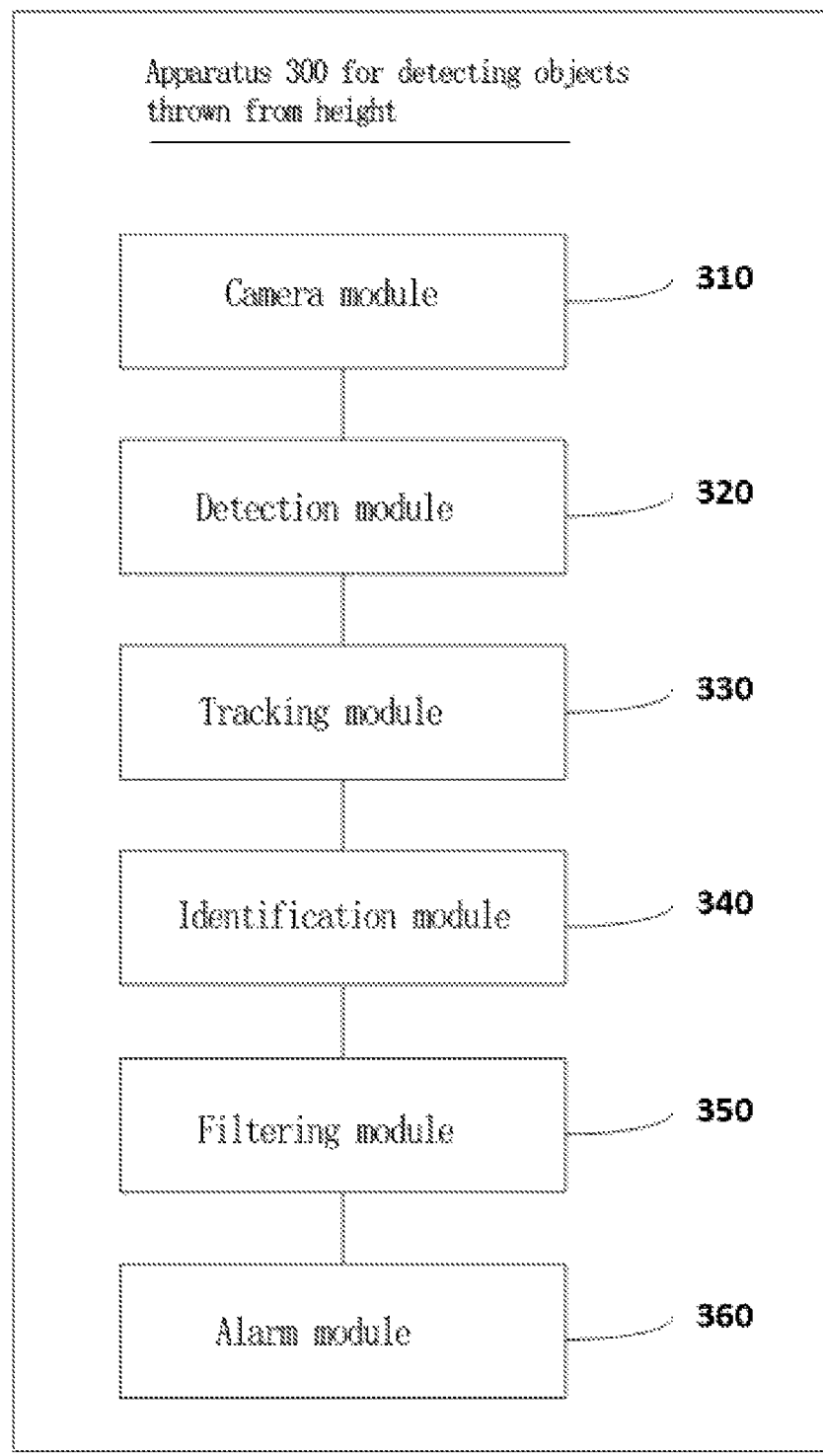
FIG. 3 is a schematic diagram of the structure of the apparatus for detecting objects thrown height according to an embodiment of the present application.

FIG. 3 is a schematic diagram of the structure of the apparatus 300 for detecting objects thrown height according to an embodiment of the present application, the apparatus comprising:

a camera module 310 configured to capture a target video image in real time;

a detection module 320 configured to detect all moving objects within the target video image using a background modeling algorithm;

a tracking module 330 configured to track the detected moving objects using Kalman filtering to obtain trajectory characteristics and related parameters of the moving objects, including trajectory curve trend, object movement acceleration, intersection over union of previous and current frames of the object, object shape and pixel size changes;

an identification module 340 configured to determine whether the objects are objects thrown from height through rule-based identification of objects thrown from height;

a filtering module 350 configured to perform classification using a Long Short-Term Memory (LSTM) network classification model, including inputting trajectory curve trend, object movement acceleration, intersection over union of previous and current frames of the object, object shape and pixel size changes as feature data into the LSTM, to obtain a classification result and determine whether misinformation occurs; and an alarm module 360 configured to push an alarm to the monitoring center.

It should be understood that the apparatus corresponds to the above embodiment of the method for detecting objects thrown from height and is capable of performing the various steps of the method. For the specific functions of the apparatus, referring to the above descriptions, and to avoid repetition, the detailed description is appropriately omitted here. The apparatus includes at least one software function module that can be stored in memory or solidified in the operating system (OS) of the apparatus in the form of software or firmware (firmware).

Figure 4:
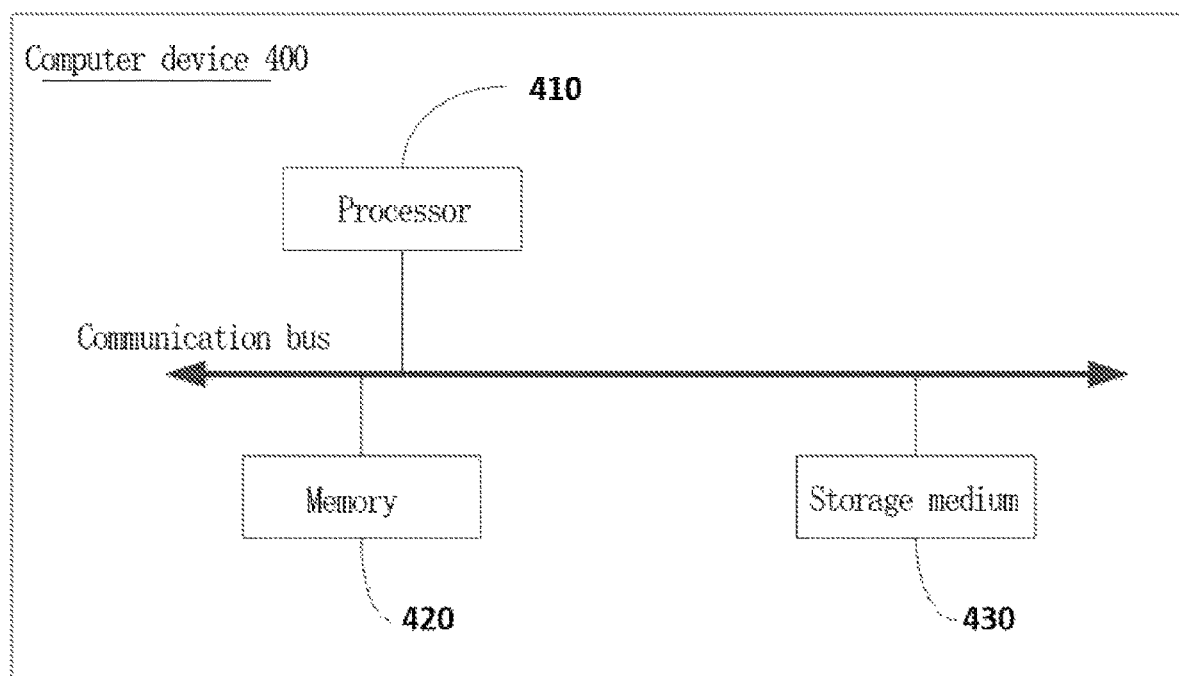
FIG. 4 is a schematic diagram of the structure of the computer device according to an embodiment of the present application.

FIG. 4 shows a schematic diagram of the structure of the computer device according to an embodiment of the present application. Embodiments of the present application further provide a computer device 400 comprising a processor 410, a memory 420 and a computer program stored in the memory 420 and executable by the processor 410, wherein the computer program, when executed by the processor 410, causes the processor to perform the method as described above.

Embodiments of the present application further provide a storage medium 430 with a computer program stored thereon, wherein the computer program, when executed by a processor 410, causes the processor to perform the method as described above.

The storage medium 430 may be implemented in any type of volatile or non-volatile storage device or a combination thereof, such as Static Random Access Memory (SRAM), Electrically Erasable Programmable Read-Only Memory (EEPROM), Erasable Programmable Read Only Memory (EPROM), Programmable Read-Only Memory (PROM), Read-Only Memory (ROM), Read-Only Memory (ROM), magnetic memory, flash memory, magnetic disk or optical disc.

In the description of the present invention, the terms "first" and "second" are only used for descriptive purposes and are not to be understood as indicating or implying relative importance or implicitly specifying the number of technical features indicated. Thus, a feature defined as 'first' and 'second' may explicitly or implicitly include one or more of these features. The meaning of "a plurality of" is two or more, unless otherwise expressly and specifically limited.

In the present invention, unless otherwise expressly specified and limited, the terms "mounted," "attached," "connected," "fixed," etc. shall be used in a broad sense, for example, it may be a fixed connection, or a removable connection, or in one piece; it may be a mechanical connection or an electrical connection; it may be a direct connection or an indirect connection through an intermediate medium, and it may be a connection within two elements or an interactive relationship between two elements. For those skilled in the art, the specific meanings of the above terms in the present invention can be understood based on specific circumstances.

In the present invention, unless otherwise specified and limited, the first feature being "above" or "below" the second feature may indicate direct contact of the first and second feature, or indirect contact of the first and second feature through an intermediate medium. Moreover, the first feature being "above", "over", and "on" the second feature may indicate that the first feature is directly or diagonally above the second feature, or just indicate that the first feature is horizontally higher than the second feature. The first feature being "below", "beneath", and "under" the second feature may indicate that the first feature is directly or diagonally below the second feature, or just indicate that the first feature is horizontally lower than the second feature.

In the description, descriptions referring to the terms "an embodiment", "some embodiments", "example", "specific examples", or "some examples" mean that specific features, structures, materials, or characteristics described in conjunction with the embodiment or example are included in at least one embodiment or example of the present invention. In the description, the schematic representations of the above terms are not necessarily directed to the same embodiment or example. Furthermore, the described specific features, structures, materials or characteristics may be combined in any suitable manner in any one or more embodiments or examples. In addition, those skilled in the art may combine different embodiments or examples and features of different embodiments or examples described in the description without contradiction.

Any process or method described in the flowchart or otherwise described herein may be understood to represent a module, fragment, or portion of code comprising one or more executable instructions for implementing steps of a particular logical function or process, and the scope of the preferred embodiments of the present invention includes additional implementations in which the functions may be performed not in the order shown or discussed, including the functions involved being performed in a substantially simultaneous manner or in the reverse order, as should be understood by those skilled in the art to which embodiments of the present invention belong to.

The logic and/or steps represented in the flowchart or otherwise described herein may be considered to be, for example, a sequential list of executable instructions for implementing a logical function that may be specifically implemented in any computer-readable medium for use by, or in combination with, an instruction-executing system, apparatus, or device (such as a computer-based system, a system including processor, or other systems that can fetch and execute instructions from the instruction-executing system, apparatus, or device). For purposes of this description, a "computer readable medium" may be any device that can contain, store, communicate, transmit, or transfer a program for use by, or in combination with, an instruction-executing system, apparatus, or device. More specific examples (a non-exhaustive list) of the computer-readable medium include electrical connections (electronic devices) with one or more wires, portable computer cartridges (magnetic devices), random access memory (RAM), read-only memory (ROM), erasable editable read-only memory (EPROM or flash memory), fiber optic devices, and portable compact disc read-only memory (CDROM). In addition, the computer-readable medium may even be paper or other suitable medium on which the program can be printed, since the program may be obtained electronically, for example, by optical scanning of the paper or other medium, followed by editing, deciphering or, if necessary, processing in other suitable ways, and then storing it in the computer memory.

It should be understood that various parts of the present invention can be implemented in hardware, software, firmware or a combination thereof. In the embodiments described above, various steps or methods may be implemented in software or firmware stored in memory and executed by a suitable instruction-executing system. For example, if implemented in hardware, as in another embodiment, it may be implemented by any one or combination of the following techniques known in the art: discrete logic circuits with logic gate circuits for implementing logic functions on data signals, application specific integrated circuits (ASICs) with suitable combinational logic gates, programmable gate arrays (PGAs), field programmable gate arrays (FPGAs), etc.

Those skilled in the art can understand that all or part of the steps for implementing the above embodiments of method may be completed by instructing the relevant hardware through a program, which can be stored in a computer-readable storage medium and, when executed, includes one of the steps of the method embodiment or a combination thereof.

In addition, the various functional units in the respective embodiments of the present invention may be integrated in a processing module, or may physically exist separately, or two or more units may be integrated in a single module. The integrated module may be implemented either in the form of hardware or in the form of software functional modules. The integrated module may also be stored in a computer readable storage medium if it is implemented in the form of a software function module and sold or used as a standalone product.

The storage medium mentioned above may be a read-only memory, a magnetic disk or an optical disk, and the like. Although embodiments of the present invention have been shown and described above, it is understood that the above embodiments are exemplary and are not to be construed as limiting the present invention, and that changes, modifications, substitutions and variants of the above embodiments may be made by those skilled in the art within the scope of the present invention.

The invention claimed is:

1. A method for detecting objects thrown from height, comprising the following steps of:
   setting up a video surveillance area for capturing a target video image in real time;
   detecting all moving objects within the target video image using a background modeling algorithm;
   tracking the detected moving objects using Kalman filtering to obtain trajectory characteristics and related parameters of the moving objects, including trajectory curve trend, object movement acceleration, intersection over union of previous and current frames of the object, object shape and pixel size changes, then all trajectories being analyzed and filtered;
   identifying whether the moving objects are objects thrown from height through rule-based identification of objects thrown from height, setting an outer contour line of the building and a special position line, so that once the trajectory of a moving object crosses the contour line from inside to outside, or crosses the special position line from top to bottom, the object is identified as an object thrown from height;
   performing classification using a Long Short-Term Memory (LSTM) network classification model, including inputting trajectory curve trend, object movement acceleration, intersection over union of previous and current frames of the object, object shape and pixel size changes as feature data into the LSTM, to obtain a classification result and determine whether misinformation occurs, wherein an input layer of the LSTM network includes extracted feature data including trajectory curve trend, object moving acceleration, intersection over union of previous and current frames of the object, object shape and pixel size changes, a number of neurons in a first LSTM hidden layer is 128, a number of neurons in a second LSTM hidden layer is 32, and a number of neurons in a final output layer is 1, which represents a probability of objects thrown from height; and
   pushing an alarm to the monitoring center if the classification result of the LSTM classification model does not indicate misinformation.

2. The method for detecting objects thrown from height according to claim 1, wherein the background modeling algorithm is a single Gaussian model method, a Gaussian mixture model method, or an optical flow method to achieve detection of the moving objects.

3. An apparatus for detecting objects thrown from height, comprising:
- a camera module configured to capture a target video image in real time;
- a detection module configured to detect all moving objects within the target video image using a background modeling algorithm;
- a tracking module configured to track the detected moving objects using Kalman filtering to obtain trajectory characteristics and related parameters of the moving objects, including trajectory curve trend, object movement acceleration, intersection over union of previous and current frames of the object, object shape and pixel size changes, then all trajectories being analyzed and filtered;
- an identification module configured to identify whether the objects are objects thrown from height through rule-based identification of objects thrown from height, setting an outer contour line of the building and a special position line, so that once the trajectory of a moving object crosses the contour line from inside to outside, or crosses the special position line from top to bottom, the object is identified as an object thrown from height;
- a filtering module configured to perform classification using a Long Short-Term Memory (LSTM) network classification model, including inputting trajectory curve trend, object movement acceleration, intersection over union of previous and current frames of the object, object shape and pixel size changes as feature data into the LSTM network, to obtain a classification result and determine whether misinformation occurs, wherein an input layer of the LSTM network includes extracted feature data including trajectory curve trend, object moving acceleration, intersection over union of previous and current frames of the object, object shape and pixel size changes, a number of neurons in a first LSTM hidden layer is 128, a number of neurons in a second LSTM hidden layer is 32, and a number of neurons in a final output layer is 1, which represents a probability of objects thrown from height; and
- an alarm module configured to push an alarm to the monitoring center.

4. A computer device comprising a memory, a processor and a computer program stored in the memory and executable by the processor, wherein the computer program, when executed by the processor, causes the processor to perform the method according to claim 1.

5. A non-transitory storage medium having a computer program stored thereon, wherein the computer program, when executed by a processor, causes the processor to perform the method according to claim 1.

* * * * *